US008724610B2

(12) United States Patent
Ashikhmin et al.

(10) Patent No.: US 8,724,610 B2
(45) Date of Patent: May 13, 2014

(54) INTERFERENCE REDUCTION FOR WIRELESS NETWORKS

(75) Inventors: Alexei Ashikhmin, Morristown, NJ (US); Thomas L. Marzetta, Summit, NJ (US)

(73) Assignee: Alcatel Lucent, Paris (FR)

( * ) Notice: Subject to any disclaimer, the term of this patent is extended or adjusted under 35 U.S.C. 154(b) by 583 days.

(21) Appl. No.: 12/695,864

(22) Filed: Jan. 28, 2010

(65) Prior Publication Data

US 2011/0182279 A1 Jul. 28, 2011

(51) Int. Cl.
*H04J 3/00* (2006.01)
*H04J 3/06* (2006.01)

(52) U.S. Cl.
USPC .......................................... 370/345; 370/350

(58) Field of Classification Search
USPC .................................. 370/345, 350
See application file for complete search history.

(56) References Cited

U.S. PATENT DOCUMENTS

| | | | | |
|---|---|---|---|---|
| 6,490,263 | B2 * | 12/2002 | Kitade et al. .................. | 370/337 |
| 6,766,146 | B1 * | 7/2004 | Park et al. ........................ | 455/69 |
| 7,295,531 | B2 * | 11/2007 | Wheatley et al. ............. | 370/328 |
| 7,940,640 | B2 * | 5/2011 | Wu et al. ........................ | 370/208 |
| 8,102,832 | B2 * | 1/2012 | Agrawal et al. ............... | 370/342 |
| 8,503,402 | B2 * | 8/2013 | Goransson et al. ........... | 370/334 |
| 2005/0063298 | A1 * | 3/2005 | Ling et al. ...................... | 370/208 |
| 2006/0270416 | A1 * | 11/2006 | Perets et al. ............... | 455/452.2 |
| 2007/0177494 | A1 * | 8/2007 | Tomizawa ..................... | 370/208 |
| 2009/0190675 | A1 * | 7/2009 | Ling et al. ..................... | 375/260 |
| 2009/0213950 | A1 * | 8/2009 | Gorokhov et al. ............ | 375/260 |
| 2010/0067471 | A1 * | 3/2010 | Matsuzawa .................... | 370/329 |
| 2010/0222063 | A1 * | 9/2010 | Ishikura et al. ............... | 455/450 |
| 2010/0227566 | A1 * | 9/2010 | Kim et al. .................. | 455/67.13 |
| 2011/0299474 | A1 * | 12/2011 | Li et al. .......................... | 370/328 |
| 2012/0188888 | A1 * | 7/2012 | Wang et al. .................... | 370/252 |

FOREIGN PATENT DOCUMENTS

| | | |
|---|---|---|
| EP | 1515454 A2 | 3/2005 |
| WO | WO2009/120029 A2 | 10/2009 |

OTHER PUBLICATIONS

T.L. Marzetta, "How Much Training Is Required For Multiuser MIMO", Proceedings of Signal, Systems, and Computers, 2006, ACSS 2006, Fortieth Asilomar Conf, p. 359-363 Nov. 2006.
J. Jose, A. Ashikhmin, P. Whiting, S. Vishwanath, "Scheduling And Pre-Coding In Multi-User MIMO TDD Systems" Proceedings of IEEE Intl Conf on Commun., p. 4100-4105 (2008).
Vishwanath, S. et al. "Pilot Contamination Problem in Multi-Cell TDD Systems", Information Theory, 2009, ISIT 2009, Jun. 28, 2009, pp. 2184-2188, XP031513536.
PCT/US2011/020475 Invitation to Pay Additional Fees and, Where Applicable, Protest Fee dated Mar. 18, 2011.

* cited by examiner

*Primary Examiner* — Farah Faroul
(74) *Attorney, Agent, or Firm* — Wolff & Samson, PC (57) ABSTRACT

Embodiments are described to mitigate network interference issues and to enable a significant increase in the throughput of wireless systems. In one method, pilot transmissions of a first and second group of wireless units are synchronized. Each wireless unit of the first group and each wireless unit of the second group use a different orthogonal pilot (than others in their group) from the same group of orthogonal pilots. Also, the pilot transmissions of the second group of wireless units are synchronized so as to be shifted in time from the pilot transmissions of the first group. In another method, data from neighboring cells and pilots from wireless units are received at a cell. Channel vectors for the wireless units are then estimated using the received data from neighboring cells, the received pilots from the wireless units and previously estimated channel vectors between the cell and the neighboring cells.

7 Claims, 6 Drawing Sheets

INTERFERENCE REDUCTION FOR WIRELESS NETWORKS

FIELD OF THE INVENTION

The present invention relates generally to communications and, in particular, to interference reduction in communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

In wireless multi-cellular multi-user systems mobiles (users) located in a given cell send pilots to the base stations located in the same cells. These pilots propagate to the base stations located in neighboring cells and contaminate pilots sent by mobiles from the neighboring cells to their base stations. This precludes accurate channel estimation by the corresponding base stations. Inaccurate channel estimations lead to strong interference between downlink signals sent by the base stations from neighboring cells. Thus, new techniques that are able to mitigate this interference issue would clearly be desirable.

SUMMARY OF THE INVENTION

To address the need to mitigate known network interference issues, an approach that includes a new pilot transmission protocol and a new channel estimation technique is proposed. In general, this approach is able to provide a significant increase in the throughput of a multi-cell, multi-user wireless communication system without increasing transmission power.

In one method, pilot transmissions of a first and second group of wireless units are synchronized. Each wireless unit of the first group and each wireless unit of the second group use a different orthogonal pilot (than others in their group) from the same group of orthogonal pilots. Also, the pilot transmissions of the second group of wireless units are synchronized so as to be shifted in time from the pilot transmissions of the first group of wireless units. It is desirable that the pilot transmissions be shifted so as not to overlap in time. However, depending on the embodiment, this may not be the case or some overlap may be necessary. For example, where several groups of wireless units are all using the same group of orthogonal pilots, it may not be practical for all the groups to be shifted in time with no overlap. Some partial overlap may thus occur.

In some embodiments, each group of wireless units may be served by or associated with a different cell, while in other embodiments each group of wireless units may be served by or associated with a different group of cells. Also, depending on the particular implementation, any given cell may be either an omni-cell or a cell sector.

Various networking equipment architectures may be used to implement the pilot transmission synchronization. For example, the synchronizing may be performed by a single device, or multiple devices, such as one or more base stations, the devices acting either individually or in a distributed manner.

In another method, data from neighboring cells and pilots from wireless units are received at a cell. Channel vectors for the wireless units are then estimated using the received data from neighboring cells, the received pilots from the wireless units and previously estimated channel vectors between the cell and the neighboring cells. In some embodiments, the channel vectors between the cell and the neighboring cells is estimated at initialization and then periodically updated, i.e., tracked over time.

Also, in some embodiments, the cell determines a precoding matrix from a matrix formed by the estimated channel vectors and then transmits signaling using the precoding matrix to one or more of the wireless units.

Various networking equipment architectures may be used to implement this channel estimation technique. For example, the estimating of channel vectors may be performed by a single device, or multiple devices, such as one or more base stations, the devices acting either individually or in a distributed manner.

Specific embodiments of the present invention are disclosed below with reference to FIGS. 1-6. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

The present invention can be more fully understood with reference to FIGS. 1-6. To provide a greater degree of detail in making and using various aspects of the present invention, a description of our approach to interference reduction and a description of certain, quite specific, embodiments follows for the sake of example.

We consider multi-cell, multi-user wireless systems in which mobiles are equipped with a small number of antennas (typically one or two antennas) and base stations are equipped with a large number M of antennas. In "How Much Training Is Required For Multiuser MIMO," T. L. Marzetta, Proceedings of Signal, Systems, and Computers, 2006, ACSS 2006, Fortieth Asilomar Conference, pages 359-363, (November 2006) and in "Scheduling And Pre-Coding In Multi-User MIMO TDD Systems," J. Jose, A. Ashikhmin, P. Whiting, S. Vishwanath, Proceedings of IEEE International Conference on Communications, pages 4100-4105 (2008), it is shown that a large number of base station antennas gives a significant increase in the system throughput. It is not difficult to show that it is feasible to use up to M=200 antennas (in terms of the electronic equipment and area needed for deploying M antennas). This technology is a good candidate for future generations of wireless systems.

A standard Multi-Cell Multi-User System is organized in the following way. There are many cells that cover an extensive geographical area. In roughly the center of each cell there is a base station (BS). The BS receives and transmits data to mobiles located in the same cell.

The main reason why one can not increase the downlink transmission rate (from BSs to mobiles) is the inter-cell interference. As depicted in diagram 100 of FIG. 1, cells 2-7 are neighbors of cell 1. The downlink signals sent by a BS propagate to neighboring cells (cell 2, e.g.) and create strong interference to mobiles located in those cells.

As is explained below this is a "directed" interference; that is, this interference is significantly stronger than that which would result from a BS sending random signals. This approach proposes techniques that are able to significantly reduce the "directed" inter-cell interference and are thereby able to significantly increase downlink data transmission rates.

Figure 3:
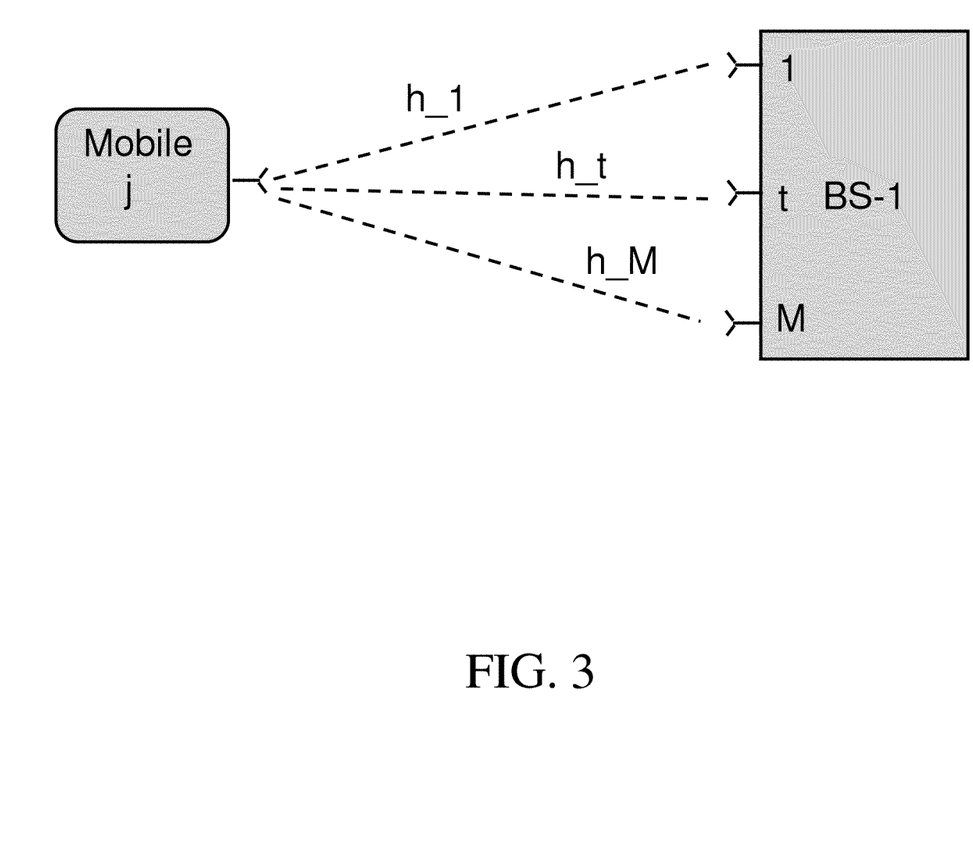
FIG. 3 is a block diagram depiction of a base station and a mobile in accordance with various embodiments of the present invention.
Figure 4:
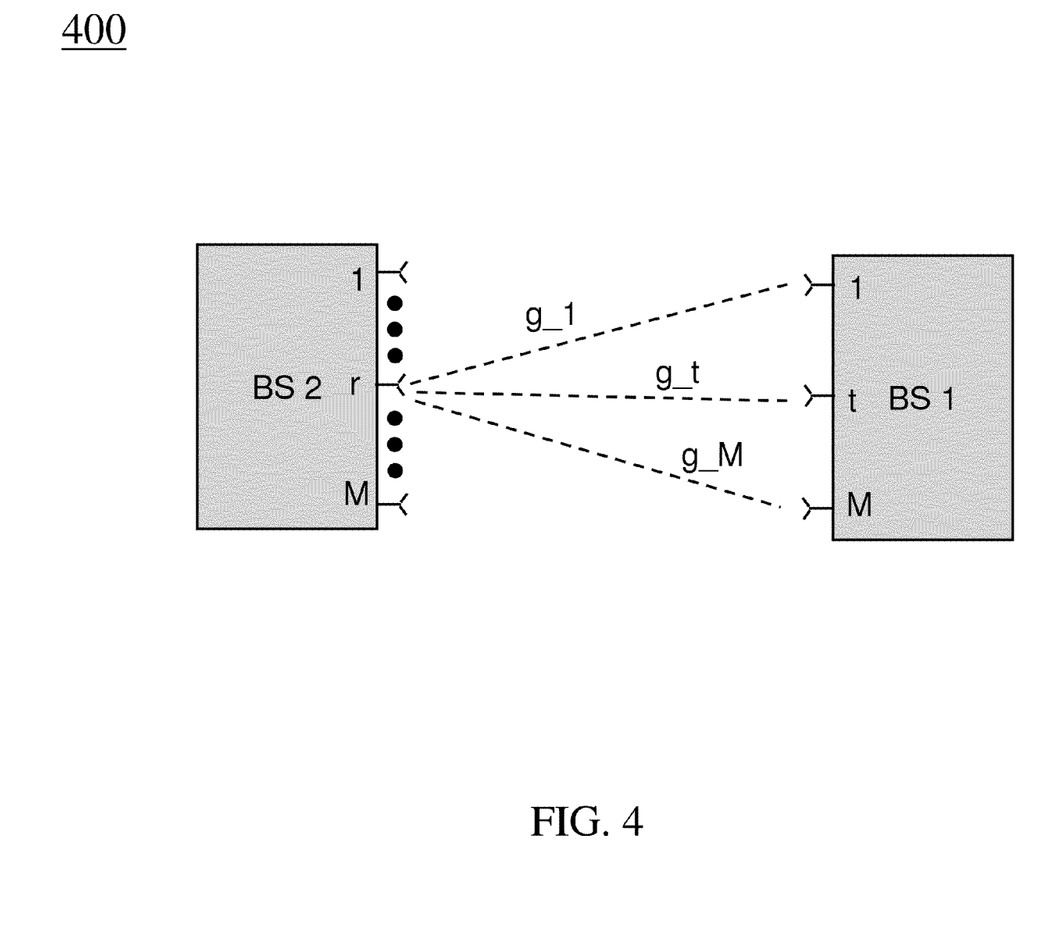
FIG. 4 is a block diagram depiction of neighboring base stations in accordance with various embodiments of the present invention.
Figure 5:
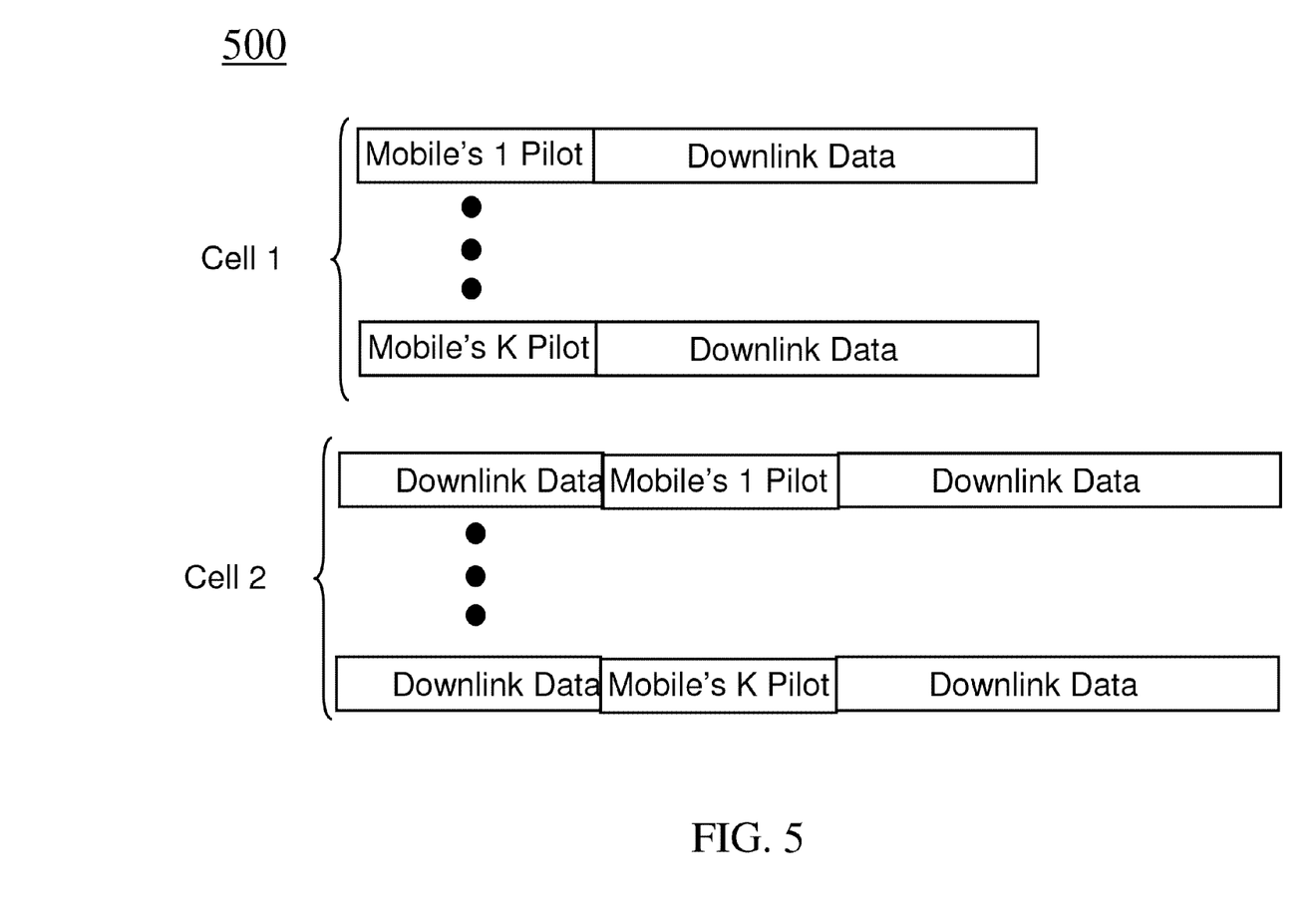
FIG. 5 is a block diagram depiction of mobile pilot transmissions shifted in time between cell 1 and cell 2, in accordance with various embodiments of the present invention.

We denote by K the total number of mobiles in any given cell. To keep notation short we assume that all cells have the same number of mobiles. We denote by BS-r the base station located in the r-th cell. We denote by $h_{1,j}=(h_1,\ldots,h_M)$ the channel vector of the j-th mobile in the 1-st cell. This vector is a complex M-tuple. As shown in FIG. 3, a signal, say $S_t$, transmitted by the t-th (t=1, ..., M) antenna of BS-1 while propagating to the j-th mobile of the 1-st cell is multiplied by $h_t$. Thus the signal received by the j-th mobile in the 1-st cell is $$x_{1,j}=s_1h_1+\ldots+s_Mh_M+\text{signals from other base stations+noise}$$

A signal transmitted by the j-th mobile while propagating to the t-th antennas of BS-1 is also multiplied by $h_t$. Similarly, by $h_{l,j}$ we denote the channel vector of the j-th mobile of the 1-th cell. If mobiles are moving then the channel vectors $h_{l,j}$ are changing. So the standard approach is to assume that the channel vectors are random vectors and that stay approximately constant only some short period of time. Since the channel vectors $h_{l,j}$ are random vectors they have expectations and covariance matrices. We assume that that the expectations of $h_{l,j}$ are zero M-tuples and that the M×M covariance matrices of the channel vectors are known.

In order to allow base stations to learn the channel vectors $h_{l,j}$ mobiles send pilots (training sequences). We denote by $\psi_{1,j}=(\psi_1,\ldots,\psi_n)$ the pilot signal of the j-th mobile of the 1-th cell. A pilot signal of any mobile of any cell is an n-tuple. The standard downlink transmission protocol is as follows:

1. The mobiles in all cells synchronously send pilots (training sequences) $\psi_{l,j}$ to their base stations (as is shown in diagram 200 of FIG. 2).
2. The BS-r receives signal $Y_r$, which is the sum of all transmitted pilots (of all mobiles from all cells) multiplied by the corresponding channel vectors plus additive noise. $Y_r$ is a n×M matrix (since BS-r has M antennas and any pilot is an n-tuple).
3. Using $Y_r$, BS-r computes estimates $\hat{h}_{r,1},\ldots,\hat{h}_{r,K}$ of the channel vectors $h_{r,1},\ldots,h_{r,K}$ of the K mobiles located in the r-th cell.
4. BS-r uses the estimates $\hat{h}_{r,1},\ldots,\hat{h}_{r,K}$ to conduct interference cancellation precoding. In other words, BS-r organizes downlink signals in such a way that signals targeted to mobiles from the r-th cell do not interfere with each other. One possible way for conducting the interference cancellation precoding is to use a linear precoding. In this case BS-r, using the estimates $\hat{h}_{r,1},\ldots,\hat{h}_{r,K}$, computes an M×K precoding matrix $A_r$. If $q_1,\ldots,q_K$ are signals that have to be transmitted to the corresponding mobiles of the r-th cell, then BS-r sends from its M antennas the vector $$s = \begin{pmatrix} s_1 \\ s_2 \\ M \\ s_M \end{pmatrix} = A_r \begin{pmatrix} q_1 \\ M \\ q_K \end{pmatrix}.$$

Figure 2:
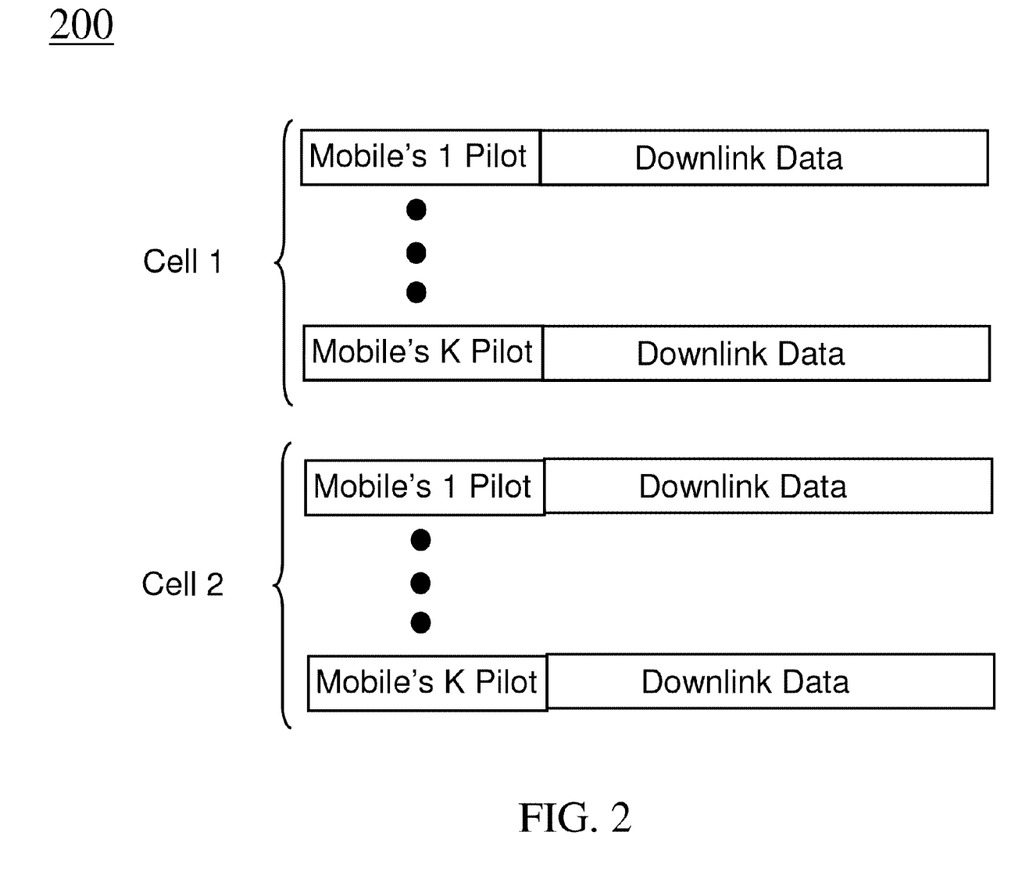
FIG. 2 is a block diagram depiction of mobile pilot transmissions followed in time by downlink data transmissions in cells 1 and 2.

The vectors s are transmitted during the downlink data transmission interval (see diagram 200). Base stations from other cells conduct the same algorithm. Unfortunately, the downlink signals sent by different base stations of the neighboring cells interfere with each other.

For efficient precoding it is very important that base stations are capable of estimating the channel vectors $h_{r,j}$ accurately. An accurate estimation of the channel vectors is not an easy problem for the following reasons. The channel vectors change quickly. The faster a mobile moves the faster its channel vector changes. Hence the pilots, which are n-tuples, should be short, so typically n=4, 5, ..., 9. From linear algebra it is known that there exist only n orthogonal pilots. If the total number of mobiles in neighboring cells is larger than n then non-orthogonal pilots must be used in the neighboring cells. A standard approach is to use the same set of n orthogonal pilots, say $p_1,\ldots,p_n$, in each cell (since these pilots are orthogonal we have $p^*_j p_i = 0$, * denotes transposition and complex conjugation of a complex matrix or complex vector). So we have $\psi_{l,j}=p_j$ for all 1 s, that is for all cells.

Non-orthogonal pilots contaminate each other, thus preventing accurate channel estimation by base stations. For instance, if pilots used by the i-th mobile of cell 1 and the j-th mobile of cell 2 are not orthogonal, then the estimate of $h_{1,i}$ produced by BS-1 will have the form $$\hat{h}_{1,i}=\alpha_1 h_{1,i}+\alpha_2 h_{2,j}+\text{additive noise}$$

($\alpha_1$, $\alpha_2$ are some complex coefficients, $h_{2,j}$ is the channel vector of the j-th mobile of cell 2).

Hence, the downlink signal sent by BS-1 will be partially directed to the i-th mobile of cell 1 and partially directed to the j-th mobile of cell 2. Thus BS-1 creates a strong "directed" interference to the j-th mobile of cell 2. This "directed" interference is significantly stronger than the interference generated by a random signal of the same power. This results in a significant reduction of the downlink transmission rate in Multi-Cell Multi-User wireless systems.

A description of additional notions follows. We denote by $G_{1,2}$ the M×M channel matrix between BS-1 and BS-2. The r-th row $g_r=(g_1, \ldots, g_M)$ of $G_{1,2}$ is the channel vector between the r-th antenna of BS-2 and M antennas of BS-1 (see diagram 400 of FIG. 4). In other words, a signal, say $S_t$, transmitted from the t-th (t=1, ..., M) antenna of BS-1 while propagating to the r-th antenna of BS-2 is multiplied by $g_t$, and vise versa—signal transmitted by the r-th antenna of BS-2 while propagating to the t-th antenna of BS-1 is multiplied by $g_t$. Similarly, by $G_{r,m}$ we denote the channel matrix between BS-r and BS-m.

We denote by $p_r$ the signal transmission power of a mobile. To keep notation short we assume that all mobiles have the same power. It is straightforward to generalize this technical description for the case when mobiles have different powers. We denote by $p_f$ the signal transmission power of a base station. To keep notation short we assume that all base stations have the same power. It is straightforward to generalize this technical description for the case when base stations have different powers. We denote by $\beta_{jlk}$ the shadowing coefficient between the l-th base station and the k-th user of the j-th cell. We denote by $\gamma_{ij}$ the shadowing coefficient between the i-th base station and the j-th base station.

The Kronecker product between an R×T matrix A and a matrix B is defined by $$A \otimes B = \begin{bmatrix} a_{11}B & \Lambda & a_{1T}B \\ M & O & M \\ a_{R1}B & \Lambda & a_{RT}B \end{bmatrix}.$$

Let J be the n×n matrix whose all elements are equal to 1, that is $$J = \begin{bmatrix} 1 & \Lambda & 1 \\ M & O & M \\ 1 & \Lambda & 1 \end{bmatrix}.$$

We propose that K mobiles from a given cell use K orthogonal pilots and send them synchronously. We propose that mobiles from different cells send shifted in time pilots. Pilots from distinct cells should not overlap in time, as is shown in diagram 500 of FIG. 5, or only barely overlap.

It is very important to note that pilots from different cells are sent at a different time so they do not contaminate each other. At the same time, the main problem in this approach is that signals transmitted by base stations are significantly stronger than signals transmitted by mobiles. Thus BS-1 will have to estimate the channel vectors $h_{1,1}, h_{1,2}, \ldots, h_{1,j}, \ldots$ in the presence of strong downlink signals transmitted by BS-2 and the base stations of the other neighboring cells.

Since base stations are static the channel matrices $G_{r,m}$ between them vary very slowly. We propose determining the channel matrices through the exchange of pilots between corresponding base stations and updating the estimates of the channel matrices between base stations periodically. We further propose using the channel matrices $G_{r,m}$ between base stations as described below.

BS-r uses the channel matrices $G_{r,1}, G_{r,2}, \ldots, G_{r,L}$ between BS-r and base stations of L neighboring cells in order to obtain accurate estimates $\hat{h}_{r,1}, \hat{h}_{r,2}, \ldots, \hat{h}_{r,j}, \ldots$ of the channel vectors $h_{r,1}, h_{r,2}, \ldots, h_{r,j}, \ldots$ (More details are included below.) BS-r may then form the matrix $$H_r = \begin{pmatrix} \hat{h}_{r,1} \\ M \\ \hat{h}_{r,K} \end{pmatrix}$$

and use it to form a precoding matrix $A_r = H^*_r (H_r H^*_r)^{-1} / \sqrt{Tr(H_r H^*_r)^{-1}}$ A detailed technique for the estimation of the channel vector $h_{1,j}$, that is the channel vector of the j-th mobile in the 1-st cell is now described. Denote by $C_h$ the M×M covariance matrix of $h_{1,j}$.

1. Form the diagonal matrix $$\Psi_{diag} = \begin{bmatrix} \psi_1 & \Lambda & 0 \\ M & O & M \\ 0 & \Lambda & \psi_n \end{bmatrix}$$

using the elements of the pilot vector $\psi_{1,j} = (\psi_1, \ldots, \psi_n)$ of the j-th mobile of the 1-st cell.

2. Compute the matrices $C = J \otimes C_h$ and $\Omega_{r,m} = I_n \otimes G^*_{r,m}$.

3. Further compute the matrix $$Q = p_r \beta_{11j} \Psi_{diag} C \Psi^*_{diag} + 1/M \sum_{t=1, t \neq 1}^{L} p_f \gamma_{t,1} \Omega_{t,1} \Omega^*_{t,1} + I_{Mn}$$

Note that computation of Q involves the channel matrices between base station BS-1 and the base stations of the L neighboring cells.

4. Compute the vector $V = \sqrt{p_r \beta_{11j} n} C \Psi^*_{diag} Q^{-1} Y_{vec}$.

Here $Y_{vec}$ is the vector obtained by the stacking the columns of the n×M matrix Y received by the BS-1 after synchronous transmission of pilots (n-tuples) by mobiles from cell 1.

5. The vector v has Mn elements. Use the first M elements of v to obtain the estimate of the channel vector $\hat{h}_{1,j} = (v_1, \ldots, v_M)$.

Figure 1:
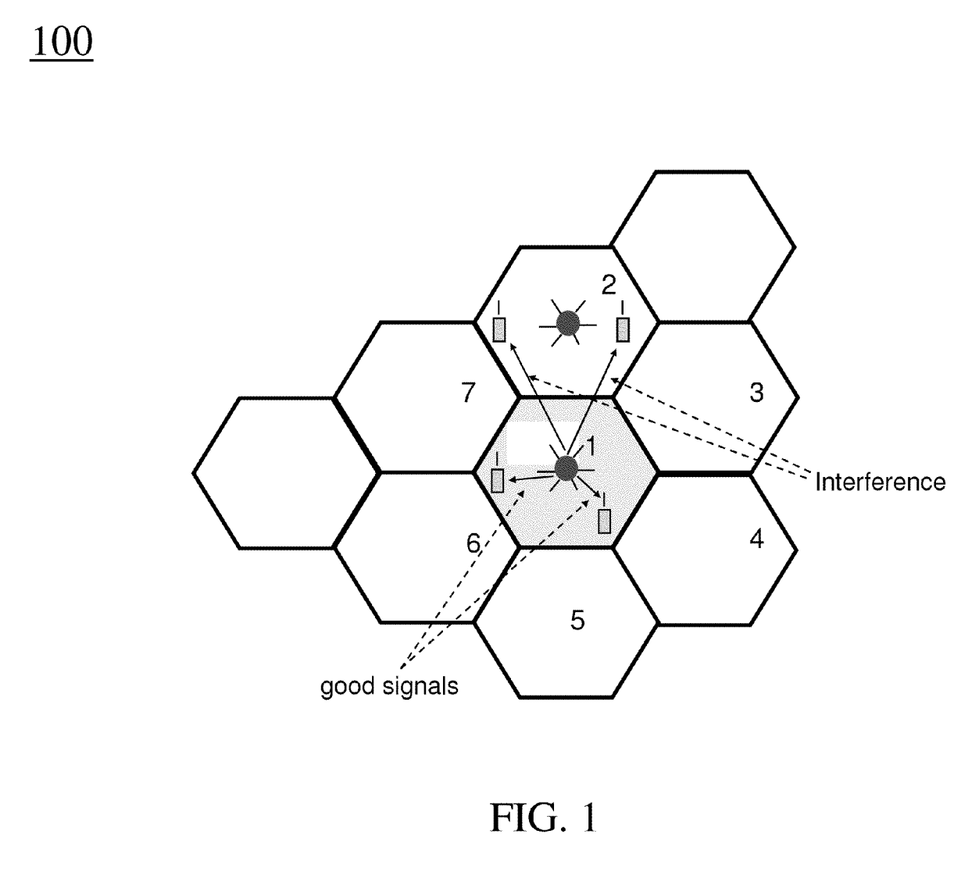
FIG. 1 depicts cells an example cellular network.
Figure 6:
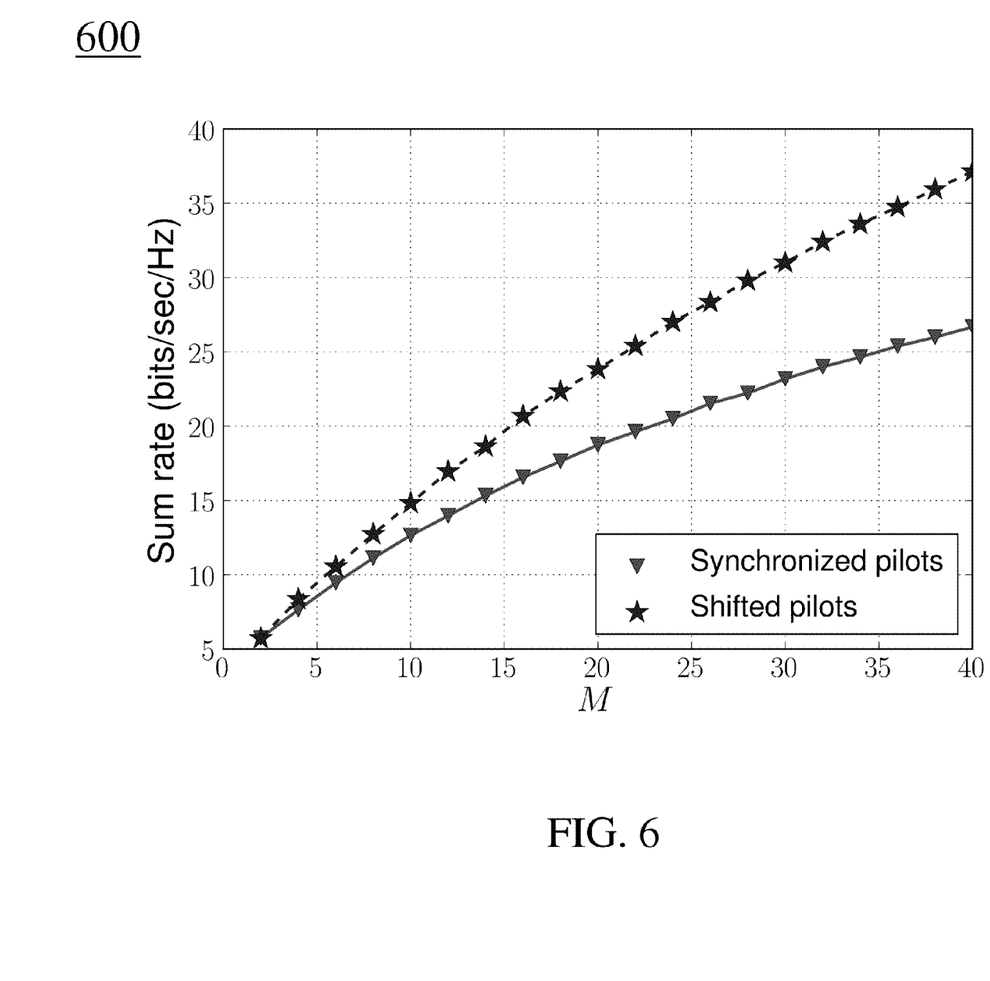
FIG. 6 is a graph depicting simulation results for the case of seven neighboring cells, in accordance with various embodiments of the present invention.

In graph 600 of FIG. 6 we present simulation results for the case of seven neighboring cells, such as cells 1-7 in diagram 100 of FIG. 1. We assume that in each cell there are four mobiles and that the mobiles use the same set of orthogonal pilots, each pilot is a 4-tuple.

As one can see the proposed scheme gives improvement over the standard scheme. If we continue to increase the number M of base station antennas then the throughput (sum rate) of the standard system will stop growing with M. At the same time the throughput of the proposed system continues to grow with M.

Aspects of the description above may be applicable to uplink data transmissions as well as downlink transmissions. The multi-user uplink (in which each of the mobiles in a cell transmit data to the base station simultaneously) also suffers from pilot contamination: the base station processes its array data, for example, by multiplying its vector of received signals by the pseudo-inverse of its estimate for the channel matrix, and if this estimate is contaminated with the channels from users in other cells then the processing will also enhance data transmissions from the users in other cells. Clearly, the technique of staggering the pilot transmission in time would also benefit uplink data transmissions as well.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method, comprising:
   synchronizing pilot transmissions of a first group of wireless units, wherein each wireless unit of the first group of wireless units uses a different orthogonal pilot from a set group of orthogonal pilots;
   synchronizing pilot transmissions of a second group of wireless units, wherein each wireless unit of the second group of wireless units uses a different orthogonal pilot from the set of orthogonal pilots and wherein synchronizing the pilot transmissions of the second group of wireless units includes shifting in time the pilot transmissions of the second group of wireless units with respect to the pilot transmissions of the first group of wireless units;
   exchanging, between networking equipment, the pilot transmissions of the first group of wireless units and the pilot transmissions of the second group of the second group of wireless units; and
   determining a channel matrix between the networking equipment based on the exchanging.

2. The method as recited in claim 1, wherein the first group of wireless units are served by at least one of:
   a different cell than the second group of wireless units or
   a different group of cells than the second group of wireless units.

3. The method as recited in claim 2, wherein a cell comprises a sectorized cell.

4. The method as recited in claim 1, wherein synchronizing pilot transmissions of the first group of wireless units comprises synchronizing, by networking equipment, pilot transmissions of the first group of wireless units and wherein synchronizing pilot transmissions of the second group of wireless units comprises synchronizing, by networking equipment, pilot transmissions of the second group of wireless units.

5. The method as recited in claim 4, wherein the networking equipment comprises a base station.

6. The method as recited in claim 1, wherein synchronizing pilot transmissions of the first group of wireless units comprises synchronizing, by a first base station, pilot transmissions of the first group of wireless units and wherein synchronizing pilot transmissions of the second group of wireless units comprises synchronizing, by a second base station, pilot transmissions of the second group of wireless units.

7. An article of manufacture comprising a non-transitory processor-readable storage medium storing one or more software programs which when executed by one or more processors performs the steps of the method of claim 1.

* * * * *